Aug. 22, 1939.   C. R. BUSCH   2,170,116
COMBINATION BRAKE BEAM AND HEAD
Original Filed April 3, 1937
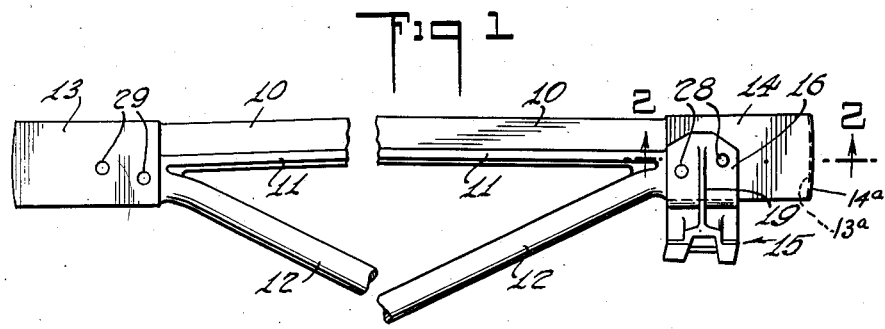
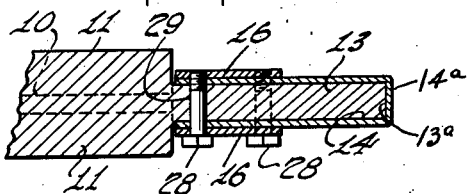
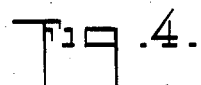
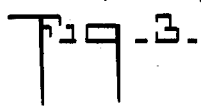
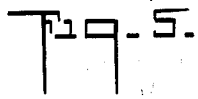
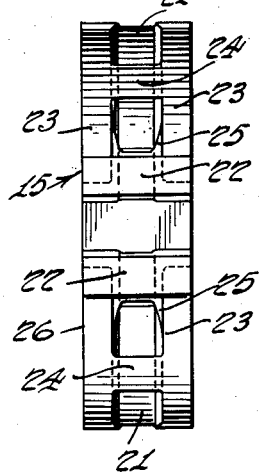
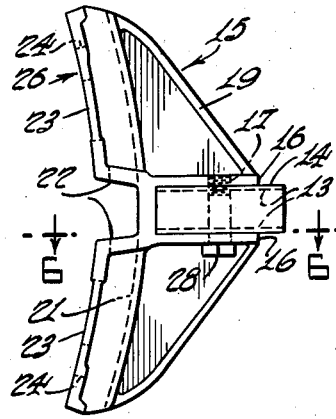
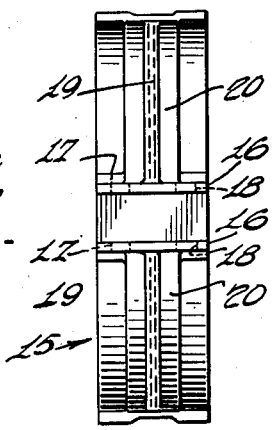
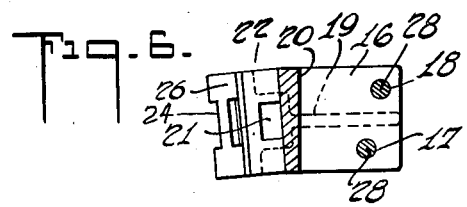
INVENTOR
Charles R. Busch.
BY Geo. S. Wheelock
ATTORNEY Patented Aug. 22, 1939

2,170,116

UNITED STATES PATENT OFFICE 2,170,116

COMBINATION BRAKE BEAM AND HEAD

Charles R. Busch, Orange, N. J., assignor to Buffalo Brake Beam Company, New York, N. Y., a corporation of New York Original application April 3, 1937, Serial No. 134,792. Divided and this application August 7, 1937, Serial No. 157,861

22 Claims. (Cl. 188—223)

The present invention relates to brake beams and heads which are conjointly adapted to each other, so as to provide a novel combination thereof. This application is a division of application Serial No. 134,792, filed April 3, 1937.

One of the objects of the invention is to provide a brake beam with indicating means at each end and to provide brake heads also having indicating means to correspond with the indicating means on the beam whereby it is possible to apply a universal reversible brake head to either end of the beam in a fool-proof manner, so that it makes no difference whether one of the brake heads is applied to one end or the other of the beam, and when the brake heads are secured to the beam they will be correctly positioned for causing the brake shoes to apply even pressure to each of a pair of car wheels.

Another object of the invention is to provide a brake beam with protecting wear plates or coverings on its end portions preferably in the form of caps or shoes, the brake heads being so mounted and secured on the protected end portions as to secure the protecting plates or coverings upon the beam itself.

These being among the objects of the present invention, the same consists of certain features of construction and combinations of parts to be hereinafter described and then claimed with reference to the accompanying drawing wherein Fig. 1 is a broken plan view showing a brake head mounted on one end of a brake beam, but omitted from the other end;

Fig. 2 is an enlarged section on line 2—2, Fig. 1;

Fig. 3 is a side elevation of a brake head showing one end of the brake beam, parts being indicated in broken lines;

Fig. 4 is an elevation of the face of the brake head shown in Fig. 3;

Fig. 5 is a rear elevation thereof; and

Fig. 6 is a transverse section on the line 6—6, Fig. 3, parts being indicated in broken lines.

The middle portion of the brake beam shown in Fig. 1 is broken away so as to suitably enlarge the illustrated parts, and it will of course be understood that the beam may be provided at its mid-length with a suitable strut not illustrated. It is preferred to make the brake head illustrated in Figs. 3 to 6 inclusive with identical upper and lower halves and to construct it in such manner that it can be reversed, that is, can be used at either end of the beam as a right or left.

Referring to Figs. 1 and 2, the compression member of the beam includes a horizontal flange or web 10 and upwardly and downwardly extending flanges or webs 11, that is to say, the compression member is substantially T-shaped with the head of the T positioned the closest to the wheels to which braking pressure is to be applied. The compression member 10, 11 and the tension member 12 of the brake beam are preferably constructed in the manner disclosed by the aforesaid application, that is, to constitute an integral brake beam structure provided with integral end portions 13. Each of such end portions 13 is flattened so as to have a thickness of much less dimension than the width of the compression member in the plane of the flanges or webs 11. Preferably each end portion 13 is flattened as by forging or otherwise.

Each end portion 13 of the beam is preferably a solid mass and each of the flat parallel upper and lower surfaces thereof is of substantial area defined by parallel edges. Preferably the length of each flattened end portion 13 is such that a brake head may be rigidly mounted upon the innermost half thereof, while the outermost half preferably extends beyond such a brake head, for the reason that it is principally intended that the ends of the beam be guided directly upon the side frames themselves of a car truck, as disclosed in my previous application Serial No. 130,881, filed March 15, 1937. However, it is obvious that if desired each end portion 13 may be made only long enough lengthwise to merely receive a brake head thereon.

Preferably as shown in Figs. 1 and 2, each end portion 13 of the brake beam is covered and protected by a wear plate or sheet 14 or the like of highly tempered metal bent into substantially U-shape so that it will cover the flat upper and lower surfaces of such end portion and extend over and cover the actual terminal of each end portion 13.

It will also be noted that preferably the body portions of the wear protecting coverings 14 are generally rectangular in the form of caps or shoes having openings to receive and enclose the end portions 13 of the beam. The upper and lower surfaces of the caps are flat and parallel so as to directly receive any wear which may be due to the movement of the beam along the side frame guides. Each end portion 13 of the beam preferably has a convexly curved or arcuate terminal surface 13a extending from the front to the back of said end portion, or breadthwise of the beam, and the caps 14 have convexly curved or arcuate ends 14a which are also convexly curved or arcuate in the plane of the end portions 13 of the beam, and as said ends 14a cover and preferably correspond with the shape of the transverse terminal surfaces 13a of the beam, they extend breadthwise of the beam or in the plane of the front and back surfaces of the end portions 13.

Referring to Figs. 3 to 6 inclusive, the preferred construction of a symmetrical reversible brake head 15 is illustrated, one of the same being shown in Figs. 1 and 2 as mounted upon one end of the brake beam. In this construction the brake head 15 has a pair of parallel back flanges or jaws 16 extending transversely of the mid-length of the head and suitably spaced apart to receive the ends of the brake beam between them. Each of these flanges is provided with a pair of holes 17, 18, the holes of each pair being offset or in staggered relation the one to the other, for the purpose to be explained. Between the holes 17, 18 there are located bracket-like back ribs or reinforcements 19 which extend lengthwise of the brake head from the flanges 16 to corresponding ends of each head, and they preferably extend in a plane which bisects the back of the head. Each head is preferably cast of an integral piece of suitable metal.

The back portion 20 of the key-way of the head is really that portion of the head which merges into the back ribs 19 and the key-way 21 is in front thereof extending in the usual manner from end to end of the head.

At the front of the head there are brake head lugs 22 between which the usual shoe lugs may be inserted to connect the shoe with the head when the same are keyed together. Extending from each brake head lug 22 to the corresponding end of the head there are solid flanking side portions 23 at the front of the head which define the width of the key-way. The flanking side portions 23 on each end of the head are preferably connected by a transverse bridge 24 which defines an opening 25 at the face of the head.

Preferably the shoe receiving face 26 of the head is laterally inclined from end to end (Fig. 6) and such inclination corresponds preferably to the usual 1 in 20 inclination of the bevel of the tread of each car wheel, so that the braking pressure of the brake shoe 27 (Fig. 6) will be applied evenly to each car wheel tread, because the brake shoe 27 will be inclined at an inclination to correspond with that of the inclination of the shoe receiving face 26.

As shown, the brake head is supported on each end of the brake beam by means of suitable fastenings 28. These fastenings may reside in rivets which secure the heads rigidly to the brake beam, but it is preferred that they reside in strong screw studs with square heads for receiving a wrench, while the other end of each of the studs is screw threaded so as to screw into threaded holes 17, 18, as the case may be, located at that end of the stud or pin. To prevent each screw stud from turning after it has been screwed home, suitable means may be employed as will be obvious to those skilled in the art. In so mounting each head upon the beam, the screw studs 28 are passed through holes 29 in each end portion 13 of the beam. The holes 29 of each pair are offset or staggered to correspond with the offsetting of the holes 17, 18 in the flanges of the head.

Referring to Fig. 1, it will be seen that the holes 29 of each end portion 13 of the beam are disposed asymmetrically with respect to each end and that the pairs of holes 29 at both ends are disposed symmetrically with respect to each other, that is, the pairs of holes at both ends of the beam extend on lines which converge. As shown, they converge in the direction of the tension member 12 of the beam. In other words, the said lines converge across the breadth of the beam.

The object of disposing the holes in the ends of the beam and the holes in the flanges of the head correspondingly, in the manner described and shown, is to render the head fool-proof against being placed in the wrong position on that end of the beam which is to receive it, because preferably the face of the head is inclined and the brake shoe is inclined as previously described, and the inclination of the faces of the brake shoes at opposite ends of the beam should incline towards each other to correspond with the coning of the car wheels. In other words, if a repair man should not set the heads on the beam in the required manner, the required manner will be indicated to him and he will know it because of the fact that if the heads are not placed as desired, the screw studs 28 cannot be passed by him through the holes in the end of the beam, but when all the holes are in registration he will know that each head is in proper position with its face inclined inwardly more or less towards the mid-length of the beam.

It will furthermore be noticed that the improved brake beam has end portions with flat upper and lower surfaces which preferably extend from the front edge to the back edge of each end portion, and that each end portion is of less vertical thickness than the beam, so that a brake head with corresponding surfaces formed on the back jaw 16 is adapted to be engaged over each end portion when slid thereon in a direction lateral of the beam, the brake head being pushed back squarely against the end of the beam. It will be furthermore observed that a trussed brake beam is provided comprising a compression member and a tension member which converge at their corresponding ends in a guiding end portion carrying the upper and lower surfaces, and that a brake head with a proper back jaw, whereof the distance between the members of the jaw is somewhat more than the vertical thickness of the adjacent portion of the tension member, may be slid outwardly along the tension member to engage the jaw with the end portion of the beam, and that the head may be removed from the end portion by sliding the jaw of the same along the tension member, that is in a direction inwardly of such end portion.

It will be observed from Fig. 1 that the holes in each end portion of the beam are so close to the ends of the vertically thicker portion 11 of the beam that said ends act as stop shoulders serving, together with the said holes, to assist in positioning the brake heads on the flat end portions 13, the heads being pushed backwardly so that the sides of the heads may be brought in contact with said ends after the heads have been slid outwardly along the tension member, when the beam is in operative position in a car truck, or if the heads are on the beam they may be pulled out to clear them from said ends when the heads are to be removed from the beam by sliding them inwardly along the tension member.

Obviously, the invention is susceptible of more or less modification without departing from the scope of the appended claims.

What I claim as new is—

1. The combination of a brake-beam having protecting wear coverings on the top and bottom of its end portions, and brake-heads mounted on the protected end portions and securing the coverings upon the beam.

2. The combination of a brake-beam having flattened end portions, protecting wear coverings on the flat top and bottom of such end portions, and brake-heads having corresponding flat portions engaging the top and bottom of such protected end portions, and fastenings securing the heads and the coverings to the beam.

3. The combination of a brake-beam having flattened end portions, protecting wear coverings of substantially U-shape extending over the opposite upper and lower flat faces and terminals of such end portions, and brake-heads having paired back flanges engaging the flat faces of such protected end portions, and means associated with the flanges for securing the heads and the coverings to the beam.

4. The combination of a brake beam having preformed indicating means at each end for designating a brake head to be mounted on the end in a given position, and brake heads thereon positionable on the end portions of the beam by sliding them laterally thereof, said end portions extending longitudinally of the beam and projecting beyond the indicating means thereof sufficiently to guide the beam on truck side frames, and each brake head having corresponding preformed indicating means located at opposite sides of the plane of operation of the beam, and each indicating means corresponding with the indicating means at either end of the beam.

5. The combination of a brake beam having indicating means at each end for designating a brake head to be mounted on the end in a given position, and brake heads thereon positionable on the beam by sliding them laterally thereof, and each having corresponding indicating means located at opposite sides of the plane of operation of the beam, and each indicating means corresponding with the indicating means at either end of the beam, the shoe-receiving faces of such heads being inclined toward each other from side to side of each head, each inclined face bisected by a shoe-lug receiving recess, and means for rigidly mounting the heads on the beam to locate the inclined faces in a definite position.

6. The combination of a brake beam provided with relatively thinner flat end portions, the beam having at each end portion means for registering with brake head fastenings, each such means being disposed asymmetrically with respect to each end and symmetrically with respect to each other, the ends of the intermediate thicker portion of the beam forming shoulders adjacent such registering means, and symmetrical brake heads on the beam in contact with such shoulders and having means registering with and corresponding to aforesaid means, and the fastenings passing through the beam and back portions of the heads.

7. The combination of a brake beam having end portions with substantially flat upper and lower surfaces extending from front edge to back edge, the end portions being of less vertical thickness than the beam, and a brake head having a back jaw adapted to engage over either end portion when slid thereon in a direction laterally of the beam.

8. The combination of a brake beam having an extended length adapting it to be guided at its extended end portions on car truck side frames and also having hard metal coverings upon such end portions to take up and protect them against wear, and brake heads mounted on the inner ends of the protected end portions and securing the coverings upon the beam.

9. The combination of a brake beam having an extended length adapting it to be guided at its extended end portions on car truck side frames, the end portions being flattened and having hard metal coverings upon the flat top and bottom thereof to take up and protect them against wear, brake heads having corresponding flat portions engaging the top and bottom of such protected end portions, and fastenings securing the heads and the coverings to the beam.

10. The combination of a brake beam having an extended length adapting it to be guided at its extended end portions on car truck side frames, the end portions being flattened, protecting coverings of hard metal upon such end portions, the coverings being of substantially U-shape extending over the upper and lower flat faces and the terminal surfaces of such end portions, brake heads having paired back flanges engaging the protected flat faces of the end portions, and means associated with the flanges for securing the heads and the U-shape coverings to the beam.

11. A trussed brake beam, comprising a compression member and a tension member, the same converging in a guiding end portion at each end of the beam, and a brake head on each end portion having a supporting jaw, the distance between the members of the jaw being somewhat more than the vertical thickness of the adjacent portion of the tension member, whereby the brake head is adapted to be removed inwardly of such end portion, along the tension member.

12. A trussed brake beam, comprising a compression member and a tension member, the same converging in a flat and solid guiding end portion at each end of the beam, and a brake head on each end portion having a supporting jaw with flat inner surfaces, the distance between such surfaces of the jaw being somewhat more than the vertical thickness of the adjacent portion of the tension member, whereby the brake head is adapted to be removed inwardly of such end portion, along the tension member.

13. The combination of a brake beam having an extended length adapting it to be guided at its extended end portions on car truck side frames and also having relatively harder metal coverings upon such end portions to take up and protect them against wear, and brake heads mounted on the inner ends of the protected end portions.

14. The combination of a brake beam and brake heads rigidly mounted thereon, end portions from the beam extending beyond the outer sides of the brake heads at the mid-lengths of the heads so that the beam may be guided on car-truck side frames, and the shoe receiving faces of the heads being constantly inclined away from said end portions in a direction towards the opposite inner sides of the heads and towards each other, whereby either head is adapted to be used at either end of such beam and brake shoes may be mounted on the faces of the heads in a position also inclined away from such extended end portions.

15. A wear protecting cap or shoe for brake beam ends adapted to be supported on lateral guides of car truck side frames, said cap being adapted to enclose the end of a brake beam, and projecting outwardly beyond the brake head supporting portion of the beam, the inner end portion of the cap being adapted to support a brake head.

16. A wear protecting cap or shoe for brake beam ends adapted to be supported on lateral guides of car truck side frames, said cap being in the form of a generally rectangular metal body adapted to enclose the end of a brake beam, the inner end portion of the cap being adapted to support the jaws of a brake head and being provided with openings for receiving brake head fastening means.

17. The combination with a brake beam the ends of which are adapted to be supported by lateral guides of car truck side frames, of a wear protecting cap or shoe enclosing each end of the beam and provided with substantially parallel upper and lower faces, a brake head having substantially parallel upper and lower jaws for engaging said faces, and means for securing the cap and head together.

18. The combination with a brake beam having ends with flat surfaces and adapted to be supported by guides associated with car truck side frames, of a shoe enclosing each end of the beam and provided with substantially parallel upper and lower faces for slidably engaging said guides.

19. A brake beam having caps or thimbles secured over its ends, the caps or thimbles being made of hard metal for taking wear, and the surfaces thereof which are substantially in line with the beam being convexly curved in the plane which the front and back of the beam occupy.

20. A brake beam having hard metal wear pieces secured to each end of the beam and having wear surfaces in line with the beam, such surfaces being formed on arcs having their centers between such surfaces, and each arc extending in the plane which the front and back of the beam occupy.

21. A brake beam having hard metal wear pieces secured to each end of the beam and having wear surfaces in line with the beam, such surfaces being formed on arcs having their centers between such surfaces, and each arc extending in the plane which the front and back of the beam occupy, such wear pieces extending for sufficient distances inwardly along the beam to provide surfaces for receiving brake-heads.

22. A brake beam having hard metal wear pieces rigidly secured to each end of the beam and having wear surfaces in line with the beam ends, and covering the transverse terminal surfaces of said ends to protect them from wear.

CHARLES R. BUSCH.